Oct. 12, 1926.
A. G. SWORD
1,602,467
TIRE INFLATING SYSTEM
Filed July 20, 1923    3 Sheets-Sheet 1
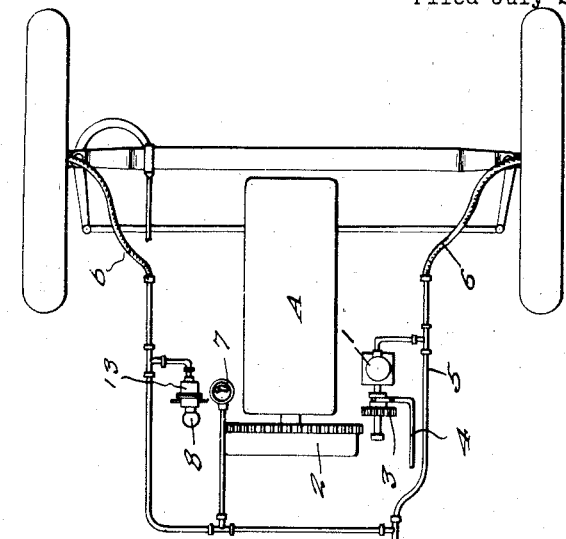
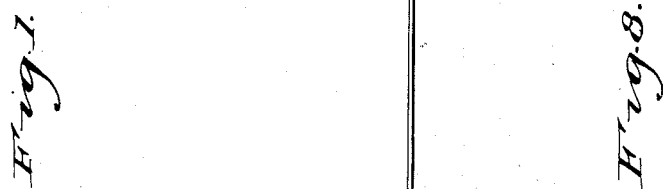
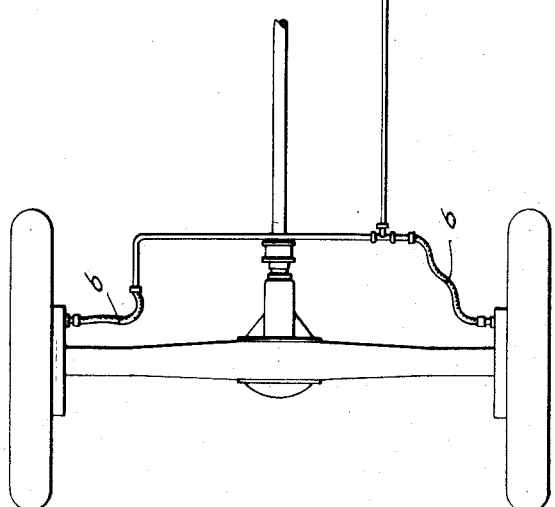
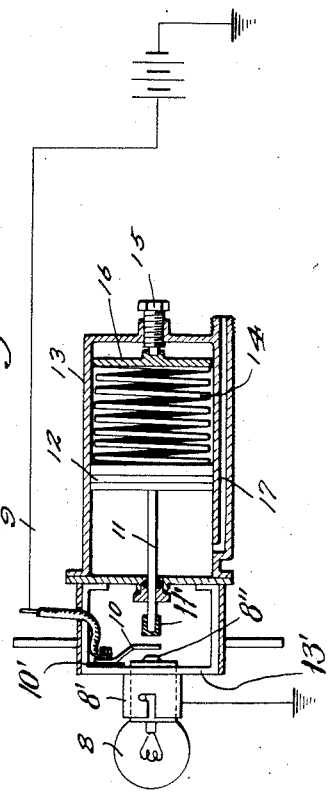
*A. G. Sword*
INVENTOR
BY *Victor J. Evans*
ATTORNEY

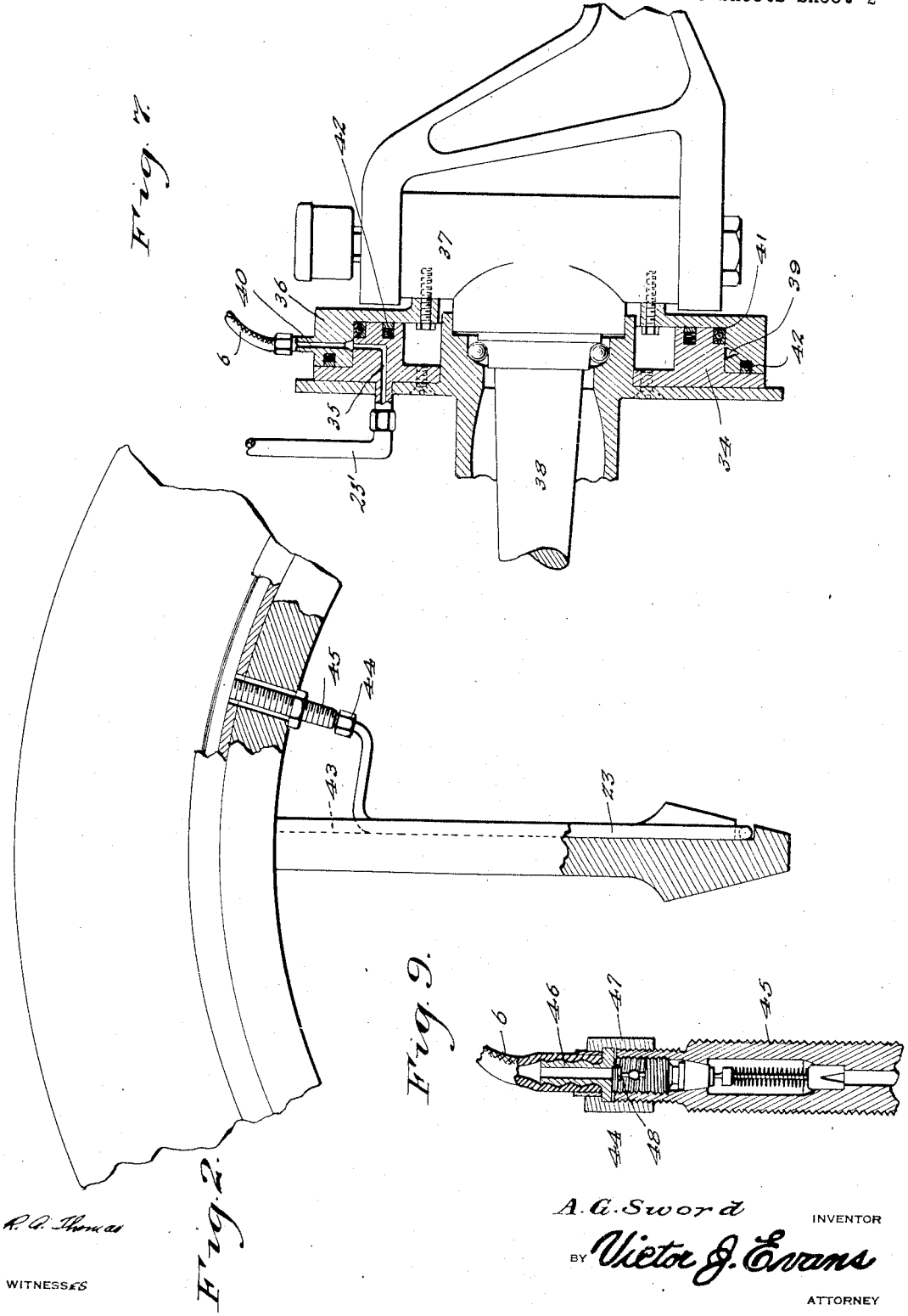

Oct. 12, 1926.
A. G. SWORD
1,602,467
TIRE INFLATING SYSTEM
Filed July 20, 1923    3 Sheets-Sheet 3
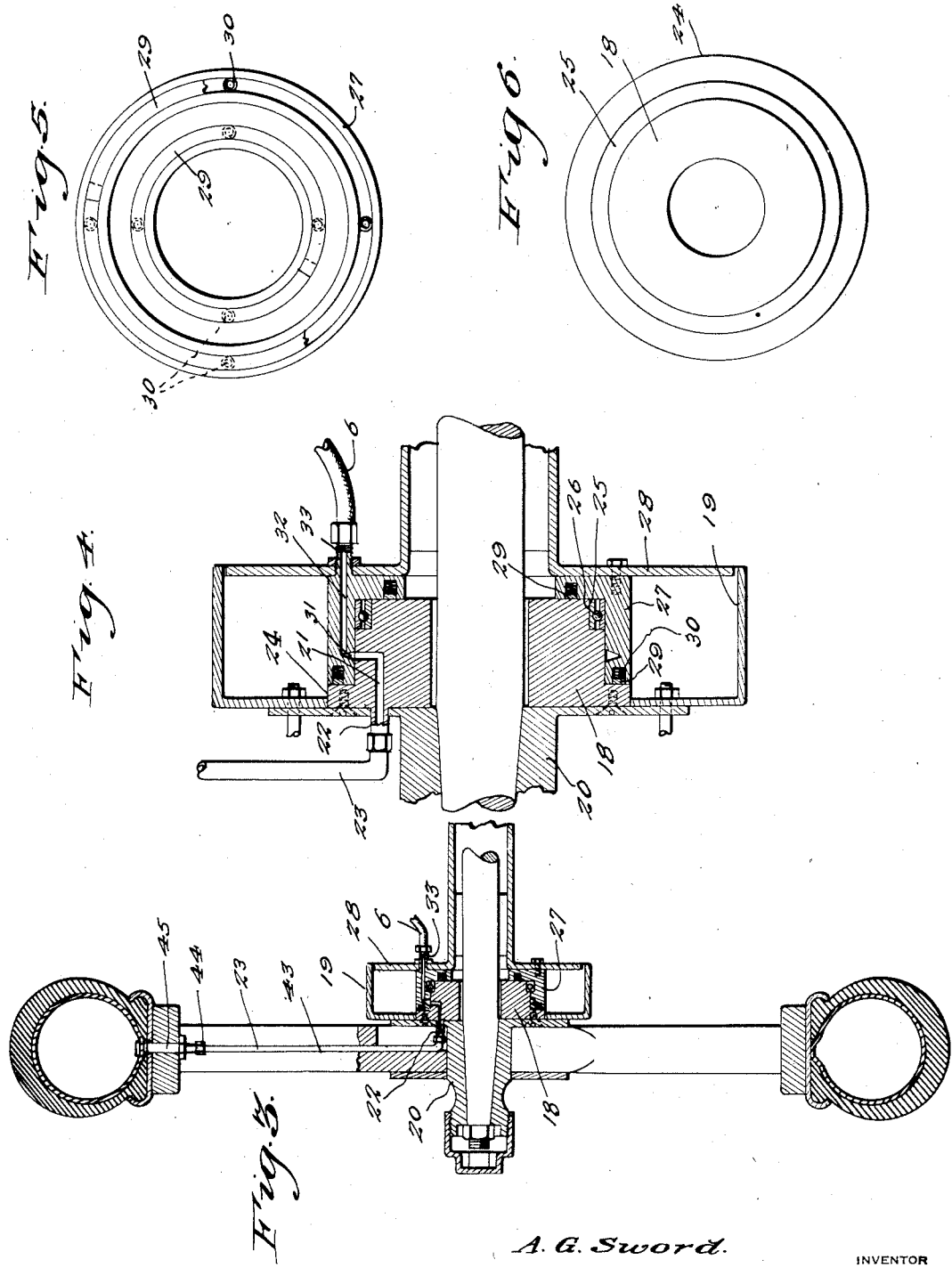

Patented Oct. 12, 1926.

1,602,467

UNITED STATES PATENT OFFICE.

AXEL G. SWORD, OF NORTHFIELD, MASSACHUSETTS.

TIRE-INFLATING SYSTEM.

Application filed July 20, 1923. Serial No. 652,817.

This invention relates to improvements in motor vehicles, the general object of the invention being to provide means whereby all the tires can be pumped up simultaneously by a pump operated from the power plant of the motor.

Another object of the invention is to provide a gage, arranged where it can be easily seen by the operator in the vehicle, for indicating the amount of air in the tires.

A further object of the invention is to provide a signal light for indicating when the air pressure in the tires is low.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a diagrammatic plan view showing the invention in use.

Figure 2 is a view partly in section showing the arrangement of parts on a wheel.

Figure 3 is a sectional view through one of the rear wheels and its hub showing the air passages.

Figure 4 is an enlarged detail view of the parts on the hub and brake drum.

Figure 5 is a face view of the stationary ring member.

Figure 6 is a face view of the rotary ring member.

Figure 7 is an enlarged view partly in section of one of the front hubs and the spindle arrangement showing the air passages therein.

Figure 8 is a sectional view showing the automatic switch for controlling the signal lamp.

Figure 9 is a sectional view through one of the valve stems and its associated parts.

As shown in Figure 1 an air pump 1 is arranged to be driven from the fly wheel 2 of the motor A of the vehicle through a pinion 3 which is adapted to be moved into and out of mesh with the teeth on the fly wheel by a lever 4 which may extend to a point adjacent the driver's seat so that the driver can connect the pump with the motor whenever desired or necessary. This pump is connected with the pipe system 5 which is suitably supported on the chassis and which has its ends connected by the hose 6 with delivery means, hereinafter to be described, which deliver the air to the valve stems of the four wheels. An air gage 7 is connected with the pipe system and said gage is preferably arranged on the dash where it can be seen by the operator. A signal lamp 8 is also arranged on the dash and the circuit 9 of said lamp is controlled by a normally open switch 10. The switch is closed by the piston rod 11 of a piston 12 which is arranged in the cylinder 13 and which is actuated by a spring 14 in the cylinder, the tension of which can be adjusted by a set screw 15 and a disc 16. The pipe system is connected with the front end of the cylinder by means of the passage 17 formed in one wall of the cylinder and which has its inner end communicating with the space in front of the piston. By adjusting the tension of the spring by means of the set screw 15 the device can be set so that the switch will be closed when the air pressure in the tires drops below any desired point. The lamp will then be lighted so as to call the driver's attention to the fact that the tires need refilling. The lamp socket 8' is so arranged on the supporting bracket 13', which is attached to the cylinder 13, that contact on the lamp base 8 is exposed inwardly and is in alignment with the switch 10, which is in the form of a spring strip, so that when the switch is pushed inwardly by the rod 11 it will engage said contact and thus complete the circuit to the lamp. The rod 11 has insulation 11' on its outer end for engaging the switch 10 and said switch is insulated from the support 13', as shown at 10'.

The rear wheels are each provided with a block 18 which is arranged in the brake drum 19 and which is secured to the hub 20 of the wheel so that the block will rotate with the wheel. The block is provided with an L-shaped air passage 21 therein which extends through a nipple 22 and this nipple is adapted to be connected by a tube 23 with the air valve of the tire. The block is provided with a flange 24 and with an annular groove 25, said groove receiving a ball bearing 26. A ring-shaped member 27, of angle shape in cross section, is fastened to the housing 28 of the rear axle so that said ring member cannot rotate. It fits over the block 18 with its outer edge engaging the flange 24 and a portion of the ring member carries one-half of the ball race. It is also provided with the packing rings 29 which are pressed outwardly by the springs 30. The member is provided with an annular groove 31 which registers with the passage 21 and a passage 32 has one end in communication with the groove and its other end passes through a nipple 33 to which one of the hose 6 is connected.

From the above it will be seen that the block 18 will rotate within the member 27 and that air can pass from the hose 6 into the tube 23 at all times as the passage 32 will always be in communication with the passage 21 through means of the groove 31. The ball bearings reduce friction between the members and the packing rings prevent leakage of air from between the members. The front wheels each have a block 34 connected with the hub thereof and this block is provided with an L-shaped passage 35 which is connected with the tube 23', which leads to the air valve of the tire. A ring member 36 embraces part of the block and this member is bolted to the part 37 of the front spindle 38 so that it is held against movement while the block 34 rotates within it. The part 36 is provided with an annular groove 39 which communicates with the passage 35 and with a passage 40 in the part 36 which is connected with the hose 6 at the front of the vehicle. Ball bearings 41 are placed between the parts and spring pressed packing rings 42 are provided for preventing leakage of air between the parts. The tubes 23 and 23' are arranged in grooves 43 in the spokes of the wheels and are connected by the couplings 44 with the valve stems 45 of the tires. Each coupling 44 includes an inner part 46 for receiving the end of the hose and the nut 47 engaging the end of the valve stem. Each coupling also carries an inner projection 48 for engaging the valve in the stem to force the same off its seat when the nut 47 is screwed home so as to place the interior of the tire tubes in communication with the air system.

From the foregoing it will be seen that the gage 7 will indicate the amount of air in the system and in the tires at all times and that the lamp 8 will be lighted when the pressure drops below a certain point so that if the driver should fail to notice the air gage his attention would be called to the fact that the tires need more air by the lighting of the lamp when the pressure drops to a low point. The air from the pump will pass through the pipes and the hose into the stationary members 27 and 36 and from the grooves in said members through the passages in the blocks to the tubes 23 and 23' and thus enter the inner tubes of the tires. This invention provides a simple means for keeping the tires inflated and the driver can tell how much air he has in the tires without leaving his seat.

It is thought from the foregoing description that the advantages and novel features of my invention will be readily apparent.

I desire it to be understood that I may make changes in the construction and in the combination and arrangement of the several parts, provided that such changes fall within the scope of the appended claim.

For instance, I may place four gages on the instrument board and connect each gage with the tire so that the gages will register the pressure in each tire instead of using one gage for all the tires.

What I claim is:—

In a signal for a pneumatic pressure apparatus for motor vehicles, a cylinder adapted to be mounted upon a part of the vehicle and having an opening arranged to be connected with the pneumatic system, a piston in the cylinder, a spring for forcing the piston toward the front end of the cylinder, means for adjusting the spring, a piston rod connected with the piston and passing through the front end of the cylinder, a support on the front end of the cylinder, a lamp socket on the support, a lamp in the socket having its contact in alignment with the rod, a switch element carried by the support and insulated therefrom and formed of resilient material with its free end interposed between the said contact and the rod so that it will be pushed against the contact when the piston moves forwardly, insulation on the outer end of the rod, and a circuit including the switch element and the socket.

In testimony whereof I affix my signature.

AXEL G. SWORD.